US006345312B1

(12) United States Patent
Bobak et al.

(10) Patent No.: US 6,345,312 B1
(45) Date of Patent: Feb. 5, 2002

(54) SELECTIVELY DUMMYING A DATA PIPE TRANSPARENT TO A WRITER APPLICATION

(75) Inventors: Roman Anthony Bobak, Wappingers Falls; Scott Brady Compton, Hyde Park; Jon Kim Johnson, Pleasant Valley; David Lee Meck, Hyde Park; William Robert Richardson, Fishkill, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/919,909

(22) Filed: Aug. 28, 1997

(51) Int. Cl.[7] .................................................. G06F 9/54
(52) U.S. Cl. ..................................................... 709/312
(58) Field of Search ................................ 709/300, 302, 709/312, 313

(56) References Cited

U.S. PATENT DOCUMENTS

| 5,325,492 A | * | 6/1994 | Bonevento et al. | 395/325 |
| 5,371,850 A | | 12/1994 | Belsan et al. | 395/200 |
| 5,448,734 A | * | 9/1995 | Hrabik et al. | 395/650 |
| 5,517,657 A | | 5/1996 | Rodgers et al. | 395/800 |
| 5,537,561 A | | 7/1996 | Nakajima | 395/375 |
| 5,592,679 A | | 1/1997 | Yung | 395/800 |
| 5,594,864 A | | 1/1997 | Trauben | 395/183.15 |
| 5,968,134 A | * | 10/1999 | Putzolu et al. | 709/302 |

OTHER PUBLICATIONS

"IBM BatchPipes/MVS Users Guide And Reference", International Business Machines Corporation, IBM Publication No. GC28–1215–01, Second Edition, Sep. 1995.
"MVS/ESA System Product: JES2 Version 4, JES3 Version 4", International Business Machines Corporation, IBM Publication No. GC28–1654–04, Fifth Edition, Dec. 1993.
"Enterprise Systems Architecture/390, Principles of Operation", International Business Machines Corporation, IBM Publication No. SA22–7201–02, Third Edition, Feb. 1995.
"IBM SmartBatch For OS/390—User's Guide and Reference", International Business Machines Corporation, IBM Publication No. GC28–1640–00, First Edition, Mar. 1997.

* cited by examiner

Primary Examiner—Alvin Oberley
Assistant Examiner—Lewis A. Bullock, Jr.
(74) Attorney, Agent, or Firm—William A. Kinnaman, Jr., Esq.; Kevin P. Radigan, Esq.; Heslin Rothenberg Farley & Mesiti P.C.

(57) ABSTRACT

A technique for selectively dummying a data pipe transparent to a writer application is provided. A writer application writes data to a local data pipe or a cross-system data pipe and one or more reader applications read data from the data pipe. The technique involves determining when a last reader application of the at least one or more reader applications closes the data pipe before the writer application has completed writing data to the data pipe. Upon determining this condition, further writing of data to the data pipe by the writer application is transparently prevented. While transparently preventing writing to a dummied data pipe, writing of data to a fitting, e.g., for a permanent record, can proceed.

19 Claims, 6 Drawing Sheets

SELECTIVELY DUMMYING A DATA PIPE TRANSPARENT TO A WRITER APPLICATION

TECHNICAL FIELD

This invention relates in general to using data pipes to transport data from one application to another application, and more particularly, to connecting two applications which are using a data pipe differently. Specifically, a writer application is attempting to write data to the pipe, after a last parallel reader application has closed access to the pipe, i.e., after only partially reading the data.

BACKGROUND OF THE INVENTION

Data piping between two units of work (e.g., a writer application and a reader application) includes the writer application writing data to a pipe and the reader application reading data from the pipe. The pipe is a conduit of a stream of data. As data is written to the pipe, the data is read from the pipe.

Within a single system (i.e., one operating system image), data piping is typically implemented using a first-in first-out (FIFO) buffer queue structure located in inboard memory. The pipe is accessible to both applications participating in the piping. Further, multiple writer and reader applications of the same system can access the same pipe.

Data piping can also be performed between applications on different systems using an external shared memory (i.e., cross-system data piping). This is described in co-pending, commonly assigned, U.S. patent application Ser. No. 08/846,718, filed Apr. 30, 1997, Bobak et. al., entitled "Cross-System Data Piping Method Using An External Shared Memory," which is hereby incorporated herein by reference in its entirety. (This reference to application Ser. No. 08/846,718 in the Background of The Invention section is not an admission that said application is prior art to this invention.)

As noted, there are certain cases where a last reader application accessing a data pipe closes a data set prior to reading all of the data being written to the data pipe by a writer application. For example, the reading process may be sampling only a first portion of the records contained in a data set being written by the writer application to the pipe media. Since the writing process has no knowledge of the destination of the data being written, it continues to operate as before, writing all data of the data set until closing the output file.

In a parallel processing data piping scenario, if the reading process does not consume all data from the data set, the writing process will eventually fill all allocated pipe media, and then be placed in a wait state for a further partner process (referred to herein as a "drain step") to drain the data pipe. This is the current implementation of an I/O subsystem running on OS/390 offered by International Business Machines Corporation entitled "IBM BatchPipes/MVS", which is described further herein below.

For example, consider a two-step job that executes on a system such as International Business Machines' OS/390. The first step of the job creates a sequential data set, and upon completion of the first step, the second step executes and reads the data set created by the first step. However, when the second step reads the data set, it reads only the first part of the data set. Jobs that operate in this manner pose problems when parallelized, which obviously must be overcome in order to allow successful execution.

Another technique which can be employed to keep writer applications and reader applications of a data pipe in sync in a parallel processing environment can involve the use of "fittings," which are described in detail in "IBM BatchPipes/MVS User's Guide and Reference," GC28-1215-01, Second Edition, September, 1995. Using this technique, a fitting could be placed on the writing application to insure that only data needed by the reading application is written to the pipe. For example, it is possible to create a fitting on the writing application's pipe data definition statement that would only allow 500,000 records to flow into the pipe if the reading application only wanted 500,000 records. This fitting, which could be specified in BatchPipeWorks syntax as "BPREAD:TAKE 500000:BPWRITE," would allow these processes to work in parallel. However, the method has a disadvantage in that it consumes unnecessary resources to process the fitting, and adds management complexity since the writing application must be aware of the way in which the reading process accesses the data.

Existing solutions for this problem are less than cost effective since they either require the reader application to read the entire data set even though the reader only requires a portion of the data set, or they require that a subsequent process be scheduled to drain the data pipe. Since the balance of the data set may be unwanted, such solutions involve unnecessary processing which wastes resources.

Therefore, a need exists in the art for an enhanced data pipe processing capability which enables-pipe access support to selectively and transparently discard data to be written to a data pipe by a writer application, without requiring additional processes to be started and managed.

DISCLOSURE OF THE INVENTION

Briefly summarized, the invention comprises in one aspect a data piping method which includes: writing data via a writer application to a data pipe; reading data from the data pipe via at least one reader application; determining when a last reader application of the at least one reader application closes the data pipe before the writer application completes writing all data to the data pipe; and upon determining that the last reader application closes the data pipe before the writer application completes writing all data, preventing further writing of data to the data pipe by the writer application, wherein the preventing of further writing to the data pipe is transparent to the writer application.

In another aspect, the invention comprises a data piping system including a data pipe, a writer application and at least one reader application. The writer application writes data to the data pipe, while the at least one reader application reads the data from the data pipe. Means are provided for determining when a last reader application of the at least one reader application closes the data pipe before the writer application completes writing data to the data pipe, and for responding thereto by preventing future writing of data to the data pipe by the writer application. The preventing of future writing being transparent to the writer application.

In a further aspect, the invention comprises an article of manufacture which includes at least one computer useable medium having computer readable program code means embodied therein for causing the piping of data. The computer readable program code means in the article of manufacture comprises computer readable program code means for causing a computer to effect writing of data by a writer application to a data pipe and to effect reading of data by at least one reader application from the data pipe; as well as computer readable program code means for causing a computer to effect determining when a last reader application of the at least one reader application closes the data pipe before the writer application completes writing all data to the data pipe and responding thereto by transparently preventing further writing of data to the data pipe by the writer application.

To restate, presented herein is a technique for selectively dummying a data pipe transparent to a writer application to enhance the ability for writer and reader applications to access a common data pipe in different ways without degrading performance, e.g., without loss of data or processing time, and without causing additional resource consumption due to an inadvertent early reader close. Advantageously, this technique eliminates the need for a drain step either as an additional step within a consuming job or as a separate job. Therefore, less resources are used to accomplish the same function. This also means that it is easier to implement parallelism in customer environments, and facilitates transparent implementation since application changes and additional processes are unneeded. Further, the solution presented herein is specific to dummying the pipe media and allows a fitting associated therewith to still be driven. Also, the technique presented facilitates the automated parallelization inherent in IBM SmartBatch for OS/390 (referenced below). Significant processing time enhancement is attained.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

In accordance with the principles of the present invention, a capability is provided to pipe access support code for preventing continued writing of unneeded data of a data file to either a local data pipe or a cross-system data pipe upon detecting closure of all reader applications to the data pipe. Preferably, the capability can be manually or dynamically selected through provision of a new subsystem parameter in the appropriate data definition (DD) statement. (For a discussion of DD parameters reference an IBM publication entitled: "MVS/ESA SP V4 JCL Reference" GC28-1654-04, fifth edition, December, 1993.) For example, an "Early Reader Close" (ERC)=Dummy parameter can be provided which when selected effectively dummies the data pipe, meaning that no additional data will be placed into the data pipe for the life of that pipe after all parallel readers have closed. This "data pipe processing" capability of the present invention is explained in detail below with reference to the accompanying figures.

Figure 1A:
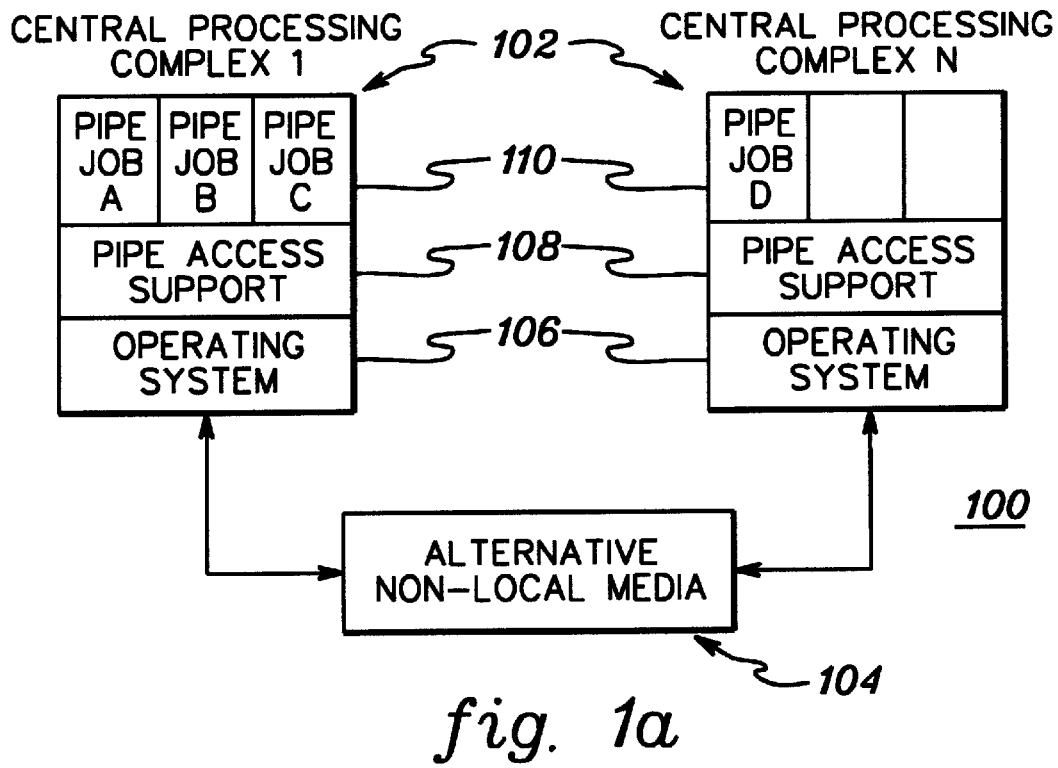
FIG. 1a depicts one example of a computing environment incorporating and using the data pipe processing capability of the present invention.

One embodiment of a computing environment incorporating and using the data pipe processing capability of the present invention is depicted in FIG. 1a. As one example, a systems processing complex (SYSPLEX) 100 can include one or more central processing complexes 102 (also referred to as processors or central electronic complexes) coupled to at least one alternative non-local media 104.

In one example, each central processing complex 102 is designed following the Enterprise Systems Architecture (ESA)/390 offered by International Business Machines Corporation. Enterprise Systems Architecture/390 is described in detail in, for instance, "Enterprise Systems Architecture/390 Principles of Operation," Publication Number SA22-7201-02, Third Edition (February 1995), which is offered by International Business Machines Corporation, and is hereby incorporated herein by reference in its entirety.

Figure 1B:
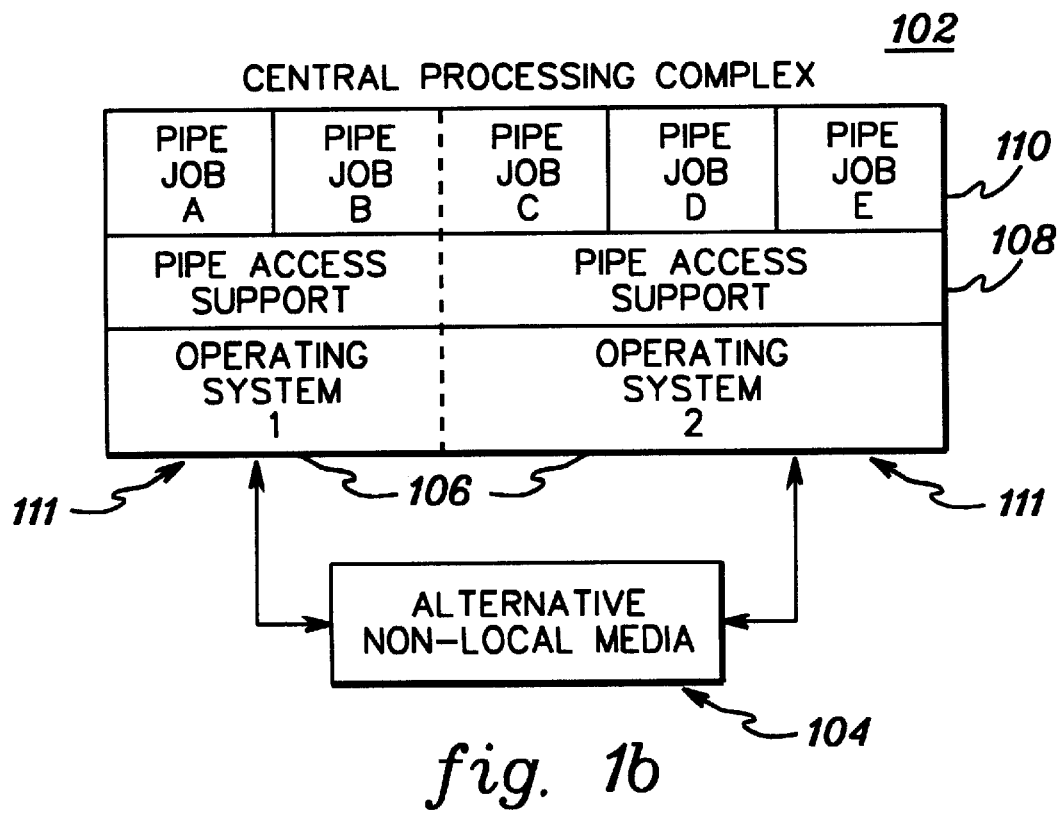
FIG. 1b depicts one example of a single central processing complex, including a plurality of operating systems, which can incorporate and use the data pipe processing capability of the present invention.

Each central processing complex may include an operating system image 106, a pipe access support 108 and at least one piping application 110, each of which is described below. In another example, a central processing complex 102 includes a plurality of systems 111 (FIG. 1b), and each system 111 includes an operating system image 106, a pipe access support 108 and at least one piping application 110. Thus, in accordance with the principles of the present invention, a central processing complex includes one or more systems, each having its own operating system image and pipe access support.

One example of operating system 106 includes the OS/390 operating system offered by International Business Machines Corporation (or the Multiple Virtual Storage (MVS)/ESA operating system, offered by International Business Machines Corporation). Each central processing complex can include one or more images of OS/390, and/or one or more of various other operating system images (such as, for instance, the AIX operating system offered by International Business Machines Corporation) or any combination of the above. As is known, each operating system image controls the execution of applications running within the system associated therewith and the processing of data.

One or more subsystems, which provide pipe access support 108, can run under the control of an operating system image. One example of a subsystem running on OS/390 and using the data pipe processing capability of the present invention is IBM BatchPipes/MVS (hereinafter referred to as BatchPipes). BatchPipes is described in detail in "IBM SmartBatch For OS/390 Users' Guide and Reference," Publication Number GC28-1640-00, First Edition, March 1997, which is offered by International Business Machines Corporation, and is hereby incorporated herein by reference in its entirety.

Pipe access support 108 includes a data access technique used by piping applications 110 to access a pipe. In one example, the data access technique includes a sequential access method, such as QSAM or BSAM. The pipe access support includes, for instance, the processing logic used to access a local pipe (i.e., a local media manager), the processing logic used to access a cross-system pipe (i.e., a cross-system media manager), and the processing logic used for the data pipe processing capability of the present invention.

Figure 2:
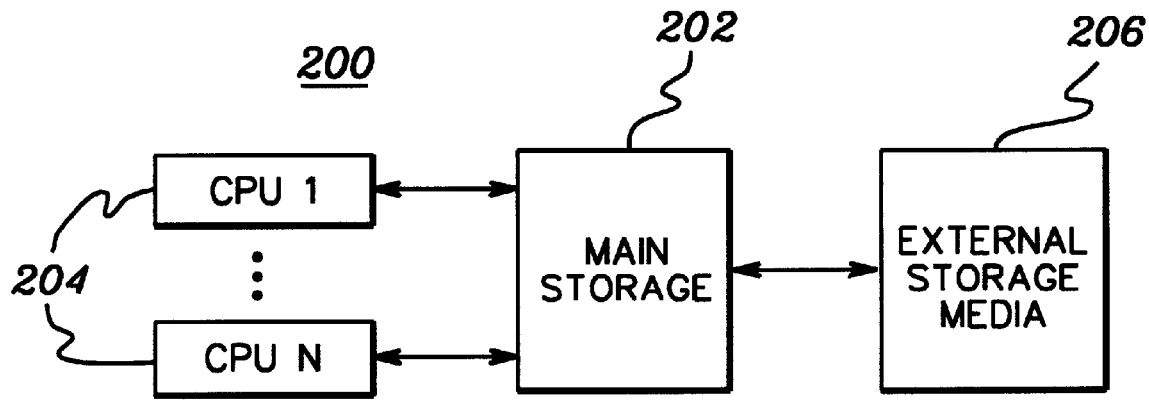
FIG. 2 depicts another example of a computer system incorporating and using the data pipe processing capability of the present invention.

FIG. 2 depicts a further example of a computing environment incorporating and using the data pipe processing capability of the present invention. Computer system 200 can also be designed following the Enterprise Systems Architecture (ESA)/390 offered by International Business Machines Corporation (e.g., an ES/9000 model 982). For details of the ESA/390 system, reference the above-incorporated publication entitled "Enterprise Systems Architecture/390 Principles of Operation."

As shown in FIG. 2, computer system 200 includes, for example, a main storage 202, one or more central processing units (CPUs) 204 and one or more external storage medium 206. Each of these components is briefly summarized below.

Central processing units 204 contain the sequencing and processing facilities for instruction execution, interruption action, timing functions, initial program loading and other machine related functions. In one embodiment, one or more of central processing units 204 executes an operating system, such as, for example, the multiple virtual storage (MVS)/ESA operating system, offered by International Business Machines Corporation. As is known, MVS/ESA controls the execution of programs running within the system and the processing of data. One or more subsystems can run under the control of MVS/ESA. One example of a subsystem running on MVS/ESA and able to incorporate the data pipe processing technique of the present invention is IBM BatchPipes.

Central processing units 204 are coupled via, for example, one or more bi-directional buses to main storage 202. Main storage 202 is directly addressable and provides for high-speed processing of data by the central processing units. Main storage 202 can be physically integrated with the CPUs or constructed as stand alone units. Main storage 202 is further coupled via, for instance, a bi-directional bus to external storage media 206. External storage media 206 may include, for instance, Direct Access Storage Devices (DASD), magnetic tapes, diskettes, and/or optical devices, to name a few.

Figure 3:
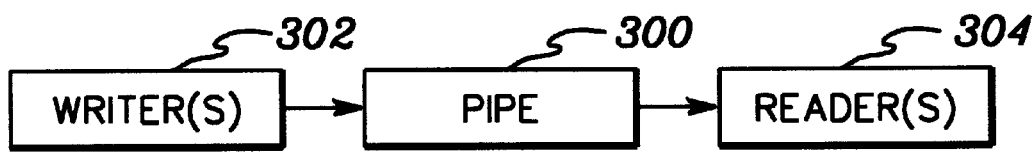
FIG. 3 depicts one embodiment of piping applications coupled together via a data pipe in accordance with the principles of the present invention.

One example of the data pipe processing technique of the present invention is described further below with reference to FIG. 3.

Piping applications 110 (FIG. 1a) use a data pipe, such as pipe 300 (FIG. 3), through standard access methods, as a medium to transport data from one application (writer) to another application (reader). As shown in FIG. 3, in one example, one or more writers 302 write data to pipe media 300 and one or more readers 304 read the data from the pipe. As one example, the data pipe can be a first-in first-out queue. Data can be read from the pipe media as soon as there is data to be read. The reader does not have to wait until all data of the data file to be written by the writer is within the pipe.

Pipe 300 may be considered a local pipe or a cross-system pipe. If all of the connections to the pipe are applications on the same system, then the data is piped through a local pipe located within local media of the system (e.g., local memory, a data space or any other media local to the system). On the other hand, if one or more of the connections to the pipe is an application on another system (either within the same Central Processing Complex or within a different Complex), then the data is piped through a cross-system pipe located within the alternative non-local media.

Referring back to FIG. 1a, in one example, alternative non-local media 104 is coupled to each of the Central Processing Complexes. Alternatively, non-local media 104 can be coupled to one or more systems (see, e.g., FIG. 1b). The systems may be in the same Central Processing Complex or different Complexes. In one embodiment, the alternative non-local media is an external shared memory, also referred to as a coupling facility. The external shared memory is, for instance, a structured-external storage (SES) processor, which includes a communications facility for communicating with the processors, a shared memory facility for storing shared data and for maintaining cross-system pipes, and a processing facility for managing the shared data and the cross-system pipes and for providing other functions. The external shared memory handles management tasks that were once handled by the individual systems or processors. It relieves the individual systems or processors of those tasks, such as the storage management tasks.

One example of an external shared memory is described in detail in U.S. Pat. No. 5,317,739, "Method and Apparatus for Coupling Data Processing Systems," Elko et al., issued on May 31, 1994 and assigned to International Business Machines Corporation, which is hereby incorporated herein by reference in its entirety.

Figure 4:
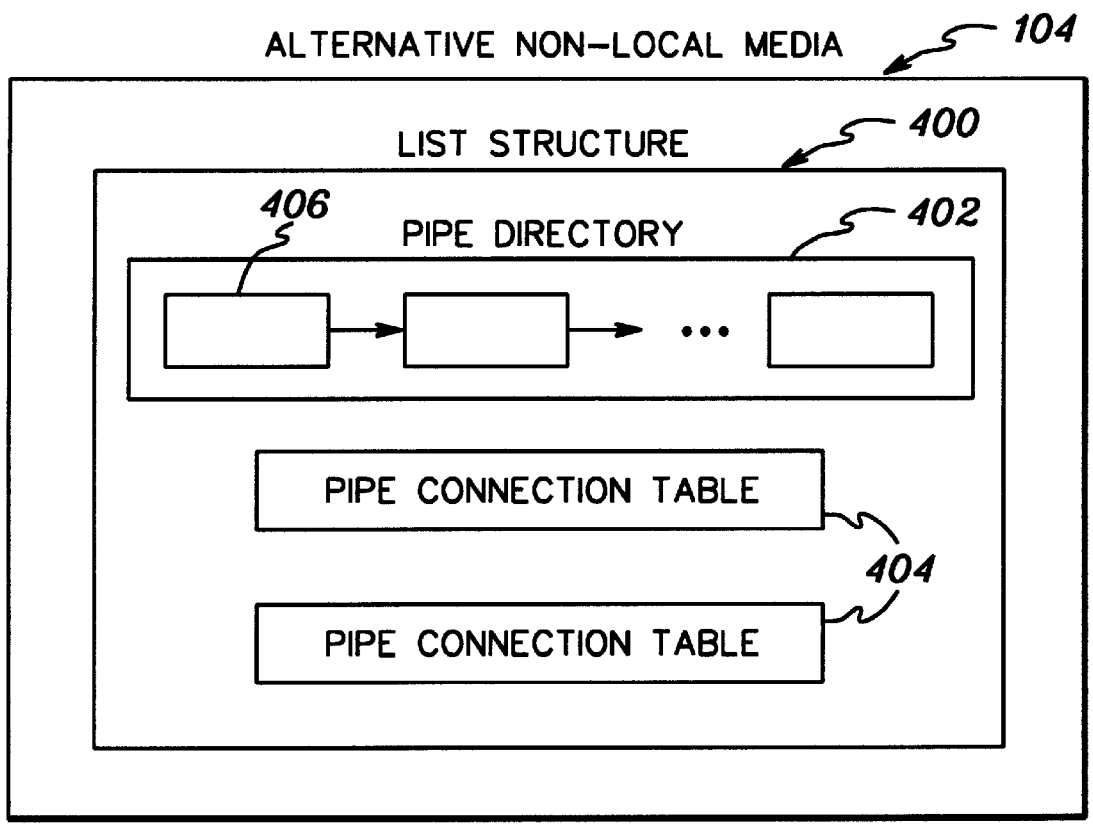
FIG. 4 depicts one example of a list structure located within an alternative non-local media, used in accordance with the principles of the present invention.

Alternative non-local media 104 includes, for instance, one or more list structures used during the data pipe processing capability of the present invention. In particular, in a cross-system implementation a list structure holds information used to define one or more pipes and the connections to those pipes. One example of a list structure 400 is depicted in FIG. 4 and described below.

In one embodiment, list structure 400 includes a number of control structures, such as a pipe directory 402 and one or more pipe connection tables 404. Pipe directory 402 includes an entry 406 for each allocated pipe. Each entry includes, for instance, the name and characteristics of the pipe being used and an indication of which systems are using the pipe. In one example, the name of the pipe includes the BatchPipes subsystem name plus a data set name.

There is a pipe connection table associated with each allocated pipe. Each pipe connection table keeps track of which reader and writer pipe applications have connected to the pipe associated with that table. It also includes the system name of each allocated application.

The control structures described above are used during the data pipe processing capability of the present invention, as described below. Additional details associated with list structures are described in, for instance, U.S. Pat. No. 5,410,695 "Apparatus and Method for List Management In A Coupled Data Processing System," Frey et al., issued on Apr. 25, 1995 and assigned to International Business Machines Corporation, which is hereby incorporated herein by reference in its entirety. Further, additional details relating to data pipes, particularly cross-system data piping, can be found in co-pending, commonly assigned, U.S. patent application Ser. No. 08/846,718, filed Apr. 30, 1997, Bobak et al., entitled "Cross-System Data Piping Method Using An External Shared Memory," which is hereby incorporated herein by reference in its entirety. Additional data piping details can also be found in co-filed, commonly assigned, U.S. patent application Ser. No. 08/919,903, filed Aug. 28, 1997, Bobak et. al., entitled "Dynamic Transitioning From A Local Pipe To A Cross-System Pipe," which is also hereby incorporated herein by reference in its entirety.

In addition to the control structures located within the list structure, there exists a local pipe block for each local pipe, which is located in memory on the local system. For example, if system A includes pipes A and B, then there would be a local pipe block for pipe A and one for pipe B. To the extent relevant to the present application, one simplified embodiment of a local pipe block is depicted in FIG. 5a.

Figure 5A:
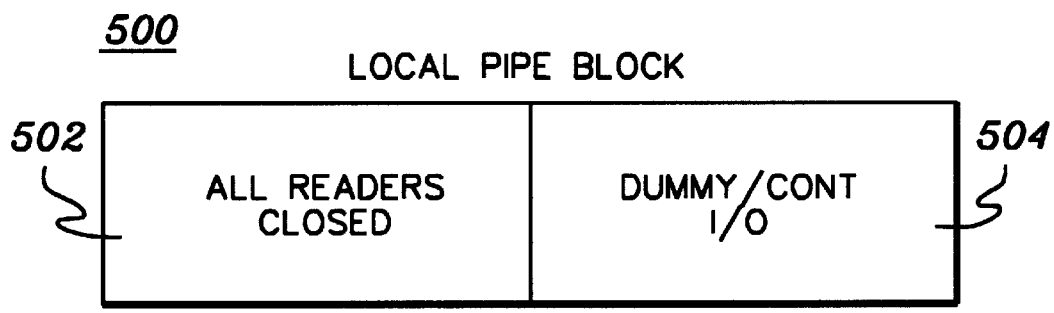
FIG. 5a depicts one example of a simplified local pipe block located within the system of the local pipe, which is used in accordance with the principles of the present invention.

As shown in FIG. 5a, pipe block 500 includes the following new fields:

(a) An All Readers Closed field 502 used to indicate whether all reader applications of the pipe have closed; and (b) A Dummy/Cont I/O field 504 which indicates whether the data pipe is dummied in accordance with the present invention, i.e., effectively a no-op of I/O to the data pipe, or whether normal operation is continued (CONT), i.e., fill the data pipe and wait for a reader application to consume the data.

In accordance with the principles of the present invention, pipe access support, for example, support 108, is responsible for appropriately setting the All Readers Closed field 502 and the Dummy/Cont I/O field 504 as described below in connection with FIG. 6. In the cross-system data piping embodiment, the dummy I/O field is still maintained in the local pipe block. If all reader applications close a cross-system connection, then the pipe connection table 404 (FIG. 4) would have a corresponding flag to indicate that all readers have closed the data pipe. Once the flag is set, the cross-system pipe access support code would update all the local pipe blocks 500 as described above in connection with FIG. 5a.

Figure 5B:
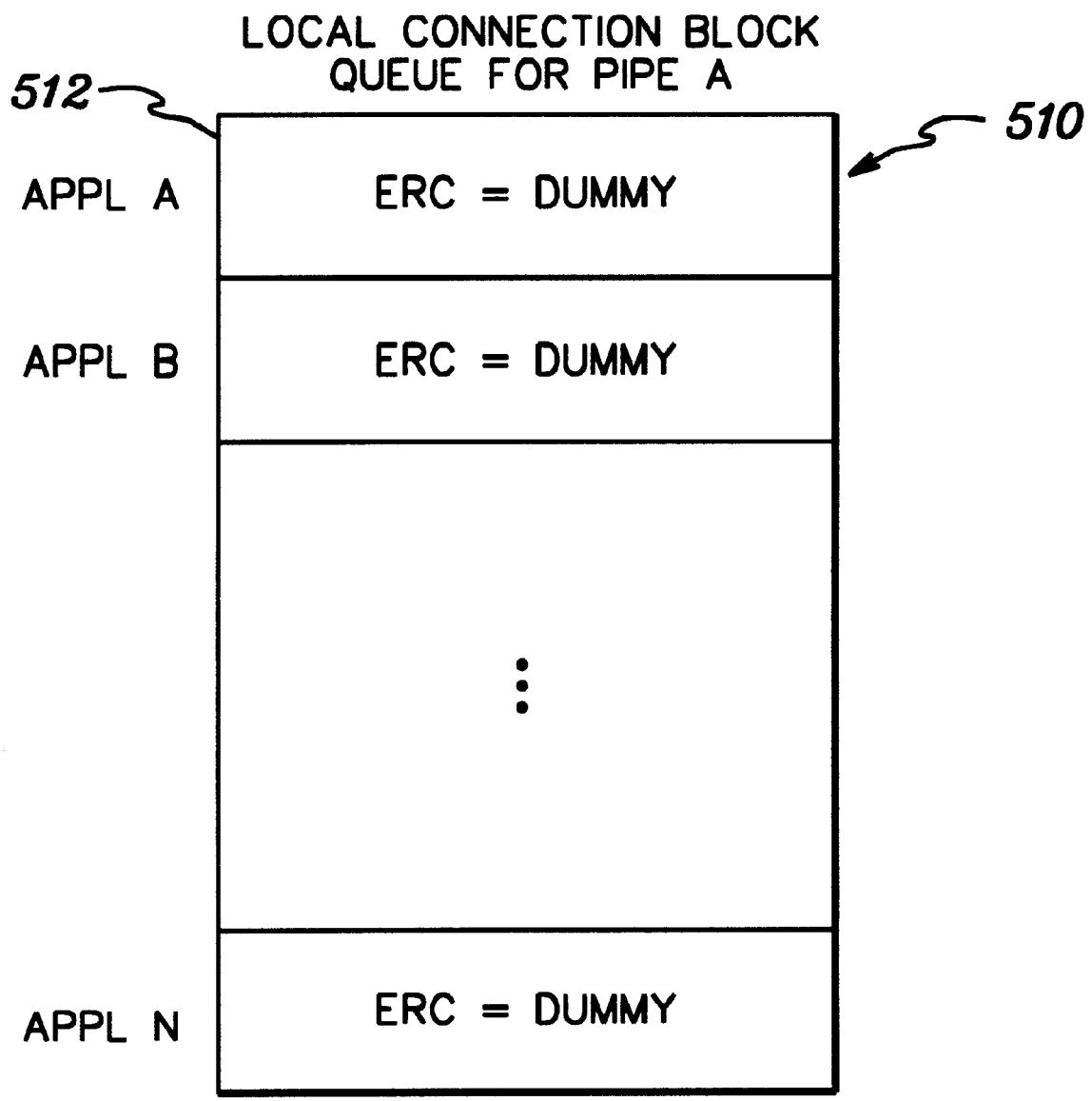
FIG. 5b depicts one example of a local connection block queue, which includes information for applications connected to a particular pipe, used in accordance with the principles of the present invention.

In addition to the above, for each pipe, there is a local connection block queue 510 (FIG. 5b), which includes one element 512 (i.e., a local connection block) for each application connected to the pipe. Each element 512 includes, for instance, an ERC=Dummy parameter, which indicates whether that application has been set as described herein for dummying the data pipe when a last reader application closes the data pipe before the writer application has completed writing all data to the data pipe. For example, the ERC=Dummy parameter is a binary mode indicator that indicates whether the application has been manually or dynamically set to dummy the data pipe. Again, the pipe access support is responsible for updating this indicator. (In another embodiment, there may be one queue for all of the pipes, in which each element pertains to a particular application in a particular pipe.)

Figure 6:
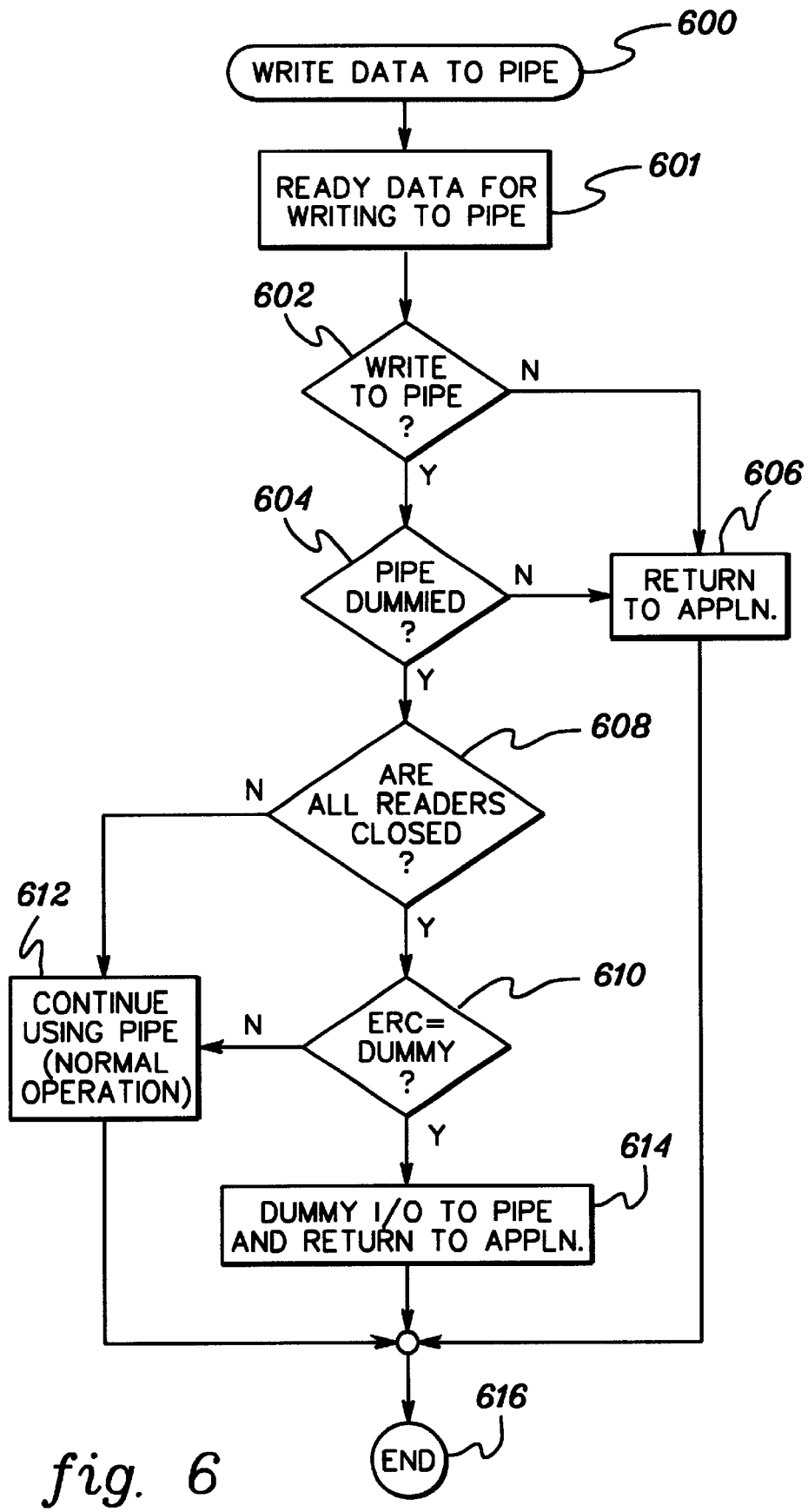
FIG. 6 depicts one embodiment of the logic associated with data pipe processing in accordance with the principles of the present invention.

One embodiment of new processing logic in accordance with the present invention is depicted in FIG. 6. In operation, a writer application issues a PUT operation to indicate it is ready to write data of a data file to the pipe media 600. Once the pipe access support receives a PUT operation, the data is readied for writing to the pipe 601. For example, if a blocking buffer is employed by the pipe access support, the data is placed into local storage, or if a fitting is employed, then control is given to the fitting in a manner described in co-pending, commonly owned United States Patent Application entitled "Data Adapter Transparent To Application I/O Path," Ser. No. 08/426,592, filed Apr. 21, 1995, which is hereby incorporated herein by reference in its entirety.

Figure 7:
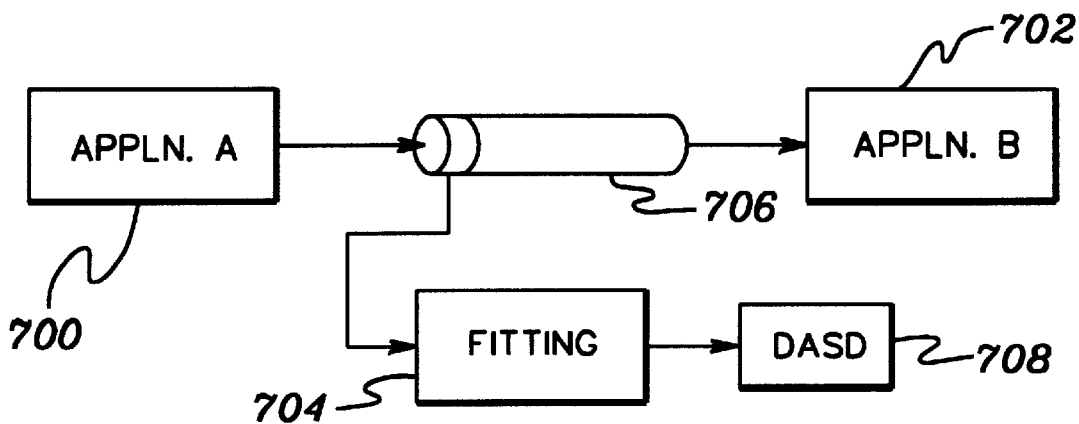
FIG. 7 illustrates a further example of a process configuration having a fitting, which is to employ the data pipe processing technique of the present invention.

Briefly described, FIG. 7 depicts an example of a data pipe 706 coupling a writer, application A 700 to a reader application B 702, wherein a fitting 704 is placed between application A and pipe 706. As one example, fitting 704, while being coupled to application A, runs independent of and transparent to application A, but uses the same system resources as application A. Fitting 704 may be employed to record hardened data to a DASD 708.

Returning to FIG. 6, the pipe access support next determines whether data is to be written to the pipe. For example, if blocking data in local storage, then a given PUT operation issued by a writer application may not require the writing of data to the data pipe. If the blocking buffer is not full, then the pipe access support returns to the writer application 606. However, if the blocking buffer is full, or if records are being written one at a time, then the pipe access support determines whether the data pipe has been previously dummied 604. If "yes," return is made to the writer application 606. Again, pursuant to this invention, when a last reader application closes on a data pipe, the pipe access support code turns on a flag to indicate that all readers are closed. In the cross-system case, this flag is located in the pipe connection table 404 (FIG. 4), and in the local data pipe case, the flag comprises the All Readers Closed field 502 of the local pipe block 500 (FIG. 5a). Thus, the processings subsequent to inquiry 604 are only considered the first time through the logic flow of FIG. 6. Thereafter, when the dummy data pipe flag is set, the pipe access support simply returns to the writer application 606.

Assuming that the pipe has not been dummied, the pipe access support checks to see if all reader applications have closed on the data pipe 602. If one or more reader applications are open, normal data pipe processing 612 is continued. However, if all readers have closed, then the pipe access support determines whether the Early Reader Closed parameter has been set 610.

As noted briefly above, in accordance with the principles of this invention, a new subsystem parameter is defined which can be expressed in a DD statement as:

//ddname DD DSN=data-set-name,SUBSYS=(BP01, 'ERC=DUMMY'), . . .

This new ERC parameter provides the user with an opportunity to indicate which action should be taken when all reading partners (e.g., parallel partners) close a data pipe before the writer finishes writing all data. The ERC=Dummy option effectively dummies the pipe, meaning that the pipe access support will place no more data into the pipe media for the life of the pipe after all parallel reading partners close. An "ERC=Cont" option, which is the default option in one embodiment, continues the placing of data into the data pipe. This option can be used when future parallel partners are expected to connect to and consume data from the data pipe. The new ERC subsystem parameter may be manually set or dynamically set by software such as described in the above-referenced "IBM SmartBatch For OS/390 Users' Guide and Reference," Publication Number GC28-1640-00, First Edition, March, 1997.

As noted above, if all readers are closed, then the pipe access support determines whether the "ERC=Dummy" parameter has been set 610. If "no", the pipe access support continues data processing in a conventional manner 612; that is, data continues to be written to the data pipe until the pipe is full at which point the writer application is placed on hold to await reading of data from the pipe.

Assuming that the ERC=Dummy statement is set, then at first instance the Dummy I/O field is set and the pipe access support returns to the writer application 614. Thereafter, processing ends 616. As noted, with each subsequent data PUT operation issued by the writer application, the pipe access support code checks at inquiry 604 to see whether the Dummy I/O field is set and if so immediately returns 606 to the writer application without writing any data to the pipe media.

Figure 8:
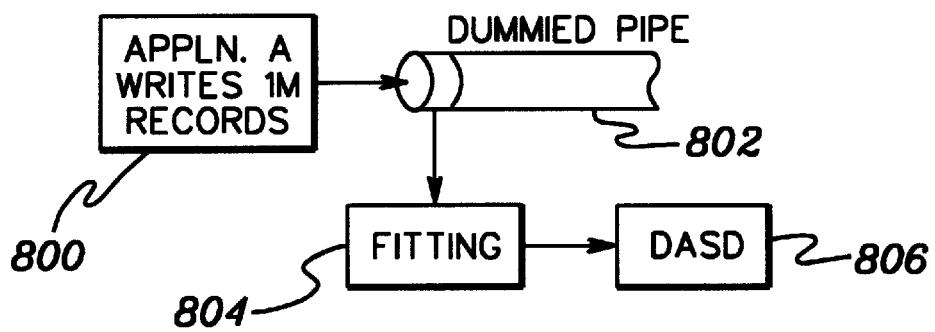
FIG. 8 depicts one embodiment of a writer application coupled to a dummied data pipe, in accordance with the principles of the present invention, having an associated fitting for writing records to DASD.

In accordance with the principles of this invention, FIG. 8 depicts an example of data pipe processing wherein the pipe access support establishes a dummy pipe while substantially simultaneously recording hardened data. Specifically, a writer application A 800 is assumed to write a series of records, for example, one million records, to a data pipe 802, which has been dummied in accordance with the logic processing discussed above. A fitting 804 is provided between application A and pipe 802 through which hardened data is recorded at DASD 806.

Those skilled in the art will note from the above discussion that a data pipe processing technique is provided herein for selectively dummying a data pipe transparent to a writer application. This data pipe processing enhances the ability for writer and reader applications to access a common data pipe in different ways, i.e., without degrading performance, e.g., without loss of data or processing time, and without causing additional resource consumption due to an inadvertent early reader close. Advantageously, the technique eliminates the need for a drain step either as an additional step within a consuming job or as a separate job. Therefore, less resources are used to accomplish the same function. This also means that it is easier to implement parallelism in customer environments, and facilitates transparent implementation since application changes and additional processes are unneeded. Further, the solution presented herein is specific to dummying the pipe media and allows a fitting associated therewith to still be driven. Significant processing time enhancement is attained.

The present invention can be included in an article of manufacture, e.g., one or more computer program products, having, for instance, computer useable media. The media has embodied therein, for instance, computer readable program code means for providing and facilitating the capabilities of the present invention. The article of manufacture can be included as part of a computer system or sold separately.

The flow diagrams depicted herein are just exemplary. There may be many variations to these diagrams or the steps (or operations) described therein without departing from the spirit of the invention. For instance, the steps may be performed in a differing order, or the steps may be added, deleted or modified. All these variations are considered part of the claimed invention.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A data piping method, comprising:

writing data via a writer application to a data pipe;

reading said data via at least one reader application from the data pipe;

determining when a last reader application of said at least one reader application closes the data pipe before said writer application completes writing all of said data to the data pipe; and upon determining that said last reader application closes the data pipe before said writer application completes writing all of said data to the data pipe, dummying further writing of data to said data pipe by said writer application, wherein said dummying is transparent to said writer application, and said writer application believes all of said data to have been successfully written to the data pipe notwithstanding otherwise, and said writer application is not in a blocked state.

2. The data piping method of claim 1, further comprising preselecting implementation of said dummying of said data pipe upon determining that said last reader application closes the data pipe before said writer application completes writing all of said data to the data pipe, wherein said preselecting comprises defining an "Early Reader Close" (ERC) parameter, said preselecting comprising setting said ERC parameter to initiate said dummying of said data pipe upon said determining that said last reader application closes the data pipe before said writer application completes writing all of said data to the data pipe.

3. The data piping method of claim 1, wherein said determining comprises checking a local pipe block associated with said data pipe for status of an "All Readers Closed" field thereof, wherein said method further comprises setting said All Readers Closed field after said last reader application closes the data pipe.

4. The data piping method of claim 3, wherein said dummying further comprises setting a dummy I/O field within said local pipe block associated with said data pipe, and thereafter returning to said writer application upon receipt of each data PUT operation issued from said writer application to write data to said data pipe.

5. The data piping method of claim 1, further comprising providing a fitting for said data pipe, and wherein said writing comprises substantially simultaneously writing said data via the writer application to the data pipe and to the fitting, and said dummying further comprises dummying only writing of data to said data pipe by said writer application, wherein said writing of data to said fitting continues.

6. The data piping method of claim 5, further comprising creating hardened data via said fitting from said writing of data by the writer application.

7. A data piping system, comprising:

a data pipe;

a writer application for writing data to said data pipe;

at least one reader application for reading data from the data pipe;

means for determining when a last reader application of said at least one reader application closes the data pipe before said writer application completes writing said data to the data pipe; and means for dummying writing of data to said data pipe by said writer application upon said determining means ascertaining that said last reader application has closed the data pipe before said writer application has completed writing all data to the data pipe, wherein said dummying is transparent to said writer application, and said writer application believes all of said data to have been successfully written to the data pipe notwithstanding otherwise, and said writer application is not in a blocked state.

8. The data piping system of claim 7, wherein said data pipe comprises either a local data pipe or a cross-system data pipe.

9. The data piping system of claim 8, further comprising means for preselecting implementation of said means for dummying said data pipe, said means for preselecting comprising means for setting an "Early Reader Close" (ERC) parameter to initiate said dummying of said data pipe upon said means for determining ascertaining that said last reader application has closed the data pipe before said writer application has completed writing said data to the data pipe.

10. The data piping system of claim 7, wherein said means for determining comprises means for checking a local pipe block associated with said data pipe for status of an "All Readers Closed" field thereof, wherein said data piping system further comprises means for setting said "All Readers Closed" field after said last reader application has closed the data pipe.

11. The data piping system of claim 10, wherein said means for dummying further comprises means for setting a Dummy I/O field within said local pipe block associated with said data pipe, and thereafter, means for returning to said writer application upon receipt of each data PUT operation issued from said writer application to write data to said data pipe.

12. The data piping system of claim 7, further comprising a fitting coupled to said data pipe, and wherein said writer application substantially simultaneously writes data to said data pipe and said fitting, and wherein said means for dummying comprises transparent means for dummying only writing of data to said data pipe, wherein writing of data to said fitting continues.

13. The data piping system of claim 12, further comprising means for creating hardened data through said writer application's writing of data to said fitting.

14. An article of manufacture, comprising:
at least one computer useable medium having computer readable program code means embodied therein for causing the piping of data, the computer readable program code means in said article of manufacture comprising:
computer readable program code means for causing a computer to effect writing of data by a writer application to a data pipe;
computer readable program code means for causing a computer to effect reading of data by at least one reader application from the data pipe;
computer readable program code means for causing a computer to effect determining when a last reader application of said at least one reader application closes reading of data from the data pipe before said writer application completes writing all of said data to the data pipe; and
computer readable program code means for causing a computer to effect dummying further writing of data to the data pipe by the writer application upon determining that the last reader application has closed the data pipe before the writer application has completed writing all of the data to the data pipe, wherein said dummying is transparent to the writer application, and the writer application believes all of said data to have been successfully written to the data pipe notwithstanding otherwise, and the writer application is not in a blocked state.

15. The article of manufacture of claim 14, further comprising computer readable program code means for causing a computer to effect preselecting implementation of said dummying of said data pipe upon determining that said last reader application closes the data pipe before said writer application completes writing all of said data to the data pipe, wherein said computer readable program code means for causing a computer to effect said preselecting comprises computer readable program code means for causing a computer to effect defining of an "Early Reader Close" (ERC) parameter, said computer readable program code means for causing a computer to effect said preselecting further comprising computer readable program code means for causing a computer to effect setting said ERC parameter to initiate said dummying of said data pipe upon said determining that said last reader application has closed the data pipe before said writer application has completed writing all of said data to the data pipe.

16. The article of manufacture of claim 14, wherein said computer readable program code means for causing a computer to effect determining comprises computer readable program code means for causing a computer to effect checking a local pipe block associated with said data pipe for status of an "All Readers Closed" field thereof, wherein said computer readable program code means in said article of manufacture further comprises computer readable program code means for causing a computer to effect setting said All Readers Closed field after said last reader application closes the data pipe.

17. The article of manufacture of claim 16, wherein said computer readable program code means for causing a computer to effect dummying further writing comprises computer readable program code means for causing a computer to effect setting of a "Dummy I/O" field within said local pipe block associated with said data pipe, and thereafter returning to said writer application upon receipt of each data PUT operation issued from said writer application to write data to said data pipe.

18. The article of manufacture of claim 14, further comprising computer readable program code means for causing a computer to effect providing of a fitting for said data pipe, and wherein said computer readable program code means for causing a computer to effect writing comprises computer readable program code means for causing a computer to effect substantially simultaneous writing of data via the writer application to the data pipe and to the fitting, and said computer readable program code means for causing a computer to effect dummying comprises computer readable program code means for causing a computer to effect dummying only writing of data to said data pipe by said writer application, wherein writing of data to said fitting continues.

19. The article of manufacture of claim 18, further comprising computer readable program code means for causing a computer to effect creating hardened data via said fitting from said writing of data by the writer application.

* * * * *